US011221293B2

(12) United States Patent
Wessel et al.

(10) Patent No.: US 11,221,293 B2
(45) Date of Patent: Jan. 11, 2022

(54) TWO-DIMENSIONAL SECOND HARMONIC DISPERSION INTERFEROMETER

(71) Applicants: Frank Joseph Wessel, Irvine, CA (US); Fernando Brandi, Genoa (IT)

(72) Inventors: Frank Joseph Wessel, Irvine, CA (US); Fernando Brandi, Genoa (IT)

( * ) Notice: Subject to any disclaimer, the term of this patent is extended or adjusted under 35 U.S.C. 154(b) by 0 days.

(21) Appl. No.: 17/204,815

(22) Filed: Mar. 17, 2021

(65) Prior Publication Data
US 2021/0199575 A1    Jul. 1, 2021

Related U.S. Application Data

(60) Provisional application No. 63/010,843, filed on Apr. 16, 2020.

(51) Int. Cl.
*G01B 9/02* (2006.01)
*G01N 21/45* (2006.01)
*G01B 11/06* (2006.01)

(52) U.S. Cl.
CPC .............. *G01N 21/45* (2013.01); *G01B 9/02* (2013.01); *G01B 9/02001* (2013.01); *G01B 9/02011* (2013.01); *G01B 9/02012* (2013.01); *G01B 9/02024* (2013.01); *G01B 9/02097* (2013.01); *G01B 11/0675* (2013.01); *G01B 2290/70* (2013.01)

(58) Field of Classification Search
CPC .............. G01N 21/45; G01B 9/02001; G01B 9/02024; G01B 9/02; G01B 9/02011; G01B 9/02097; G01B 9/02012; G01B 2290/70; G01B 11/0675
See application file for complete search history.

(56) References Cited

U.S. PATENT DOCUMENTS

| 4,184,737 A | | 1/1980 | Hirschberg |
| 5,642,195 A | * | 6/1997 | Drachev ............... G01N 21/45 |
| | | | 356/491 |
| 5,694,240 A | | 12/1997 | Sternbergh |

FOREIGN PATENT DOCUMENTS

| WO | 9415195 A1 | 7/1994 |
| WO | 2014041497 A1 | 3/2014 |

OTHER PUBLICATIONS

F.C Jobes and N.L Breiz, A prototype imaging second harmonic interferometer, Rev. Sci. Instrum. 68 (1), Jan. 1997, United States.
Till W. Liepmann and Frederic A. Hopf, Common path interferometer based on second harmonic generation, Applied Optic May 15, 1985 / vol. 24, No. 10.
F.A Hopf, A. Tomita, G. Al-Jumaily, M. Cervantes, T. Liepmann, Second-harmonic interferometers, Optics Letters / vol. 5, No. 9 / Sep. 1980.

* cited by examiner

*Primary Examiner* — Jonathan M Hansen
(74) *Attorney, Agent, or Firm* — CIONCA IP Law P.C.; Marin Cionca (57) ABSTRACT

An interferometer having a fundamental beam generator, a first second harmonic generator, a waveplate, a second second harmonic generator, a harmonic separator, and a polarizing beam splitter, mounted uniaxially, (i.e., the components are aligned along one optical axis), wherein the interferometer is adapted to change a diameter of a beam to match a diameter of a sample, and to change the diameter of the beam back to its original diameter.

20 Claims, 5 Drawing Sheets

TWO-DIMENSIONAL SECOND HARMONIC DISPERSION INTERFEROMETER

CROSS-REFERENCE TO RELATED APPLICATIONS

This application claims the benefit of U.S. Provisional Application No. 63/010,843, filed on Apr. 16, 2020, which is hereby incorporated by reference, to the extent that it is not conflicting with the present application.

STATEMENT REGARDING FEDERALLY SPONSORED RESEARCH OR DEVELOPMENT

This invention was made with United States Government Support under award number DE-SC0019789 awarded by the following agency: United States Department of Energy. The United States government has certain rights in this invention.

BACKGROUND OF INVENTION

1. Field of the Invention

The invention relates generally to the optical characterization of a transparent medium and more specifically to a method of widefield quantitative phase imaging based on fully common-path second-harmonic dispersion interferometry combined with homodyne dual-channel polarization dependent phase detection.

2. Description of the Related Art

Widefield optical characterization of transparent samples is of great importance in applications such as gas flow diagnostics, plasma diagnostics, label-free imaging of biological samples, etc. However, optically transparent medium cannot readily be imaged by techniques based on intensity-contrast measurements. Very well-known qualitative phase contrast imaging methodologies are routinely used to overcome this limitation. Additionally, as disclosed hereinbelow, some limited wide field quantitative phase imaging techniques have been demonstrated.

The optical dispersion of a medium, i.e., the variation of the refractive index with the light wavelength, $n(\lambda)$, is fundamentally related to the physical properties of its constituents. Therefore, the measure of the wavelength-dependent phase-shift for a multi-wavelength light beam traveling through a dispersive medium enables the quantification of the transparent medium's physical properties, e.g., electron density in plasma, molecular gas density, as well as to perform label-free imaging of biological samples with multi-path optical configurations.

One technique used to perform widefield quantitative phase imaging is single wavelength two-arm interferometry. Another technique involves common-path interferometric second-harmonic-generation microscopy, which is sensitive to the phase of the second-harmonic radiation from a sample.

Above methods however are of limited use and, more importantly, they may not provide an accurate means to analyze particularly dynamic samples (e.g., a gas). They may also be sensitive to vibrations, and thus difficult to implement in a reliable manner in harsh environments.

Thus, while some widefield quantitative phase imaging techniques have been demonstrated, there remains a need for a stable, precise, and low-cost quantitative phase imaging method to measure the physical properties of transparent medium, e.g., electron density in plasma and molecular gas density.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify all key aspects or essential aspects of the claimed subject matter. Moreover, this Summary is not intended for use as an aid in determining the scope of the claimed subject matter.

In an aspect, what is provided is a novel widefield quantitative phase imaging technique based on fully common-path second-harmonic dispersion interferometry combined with homodyne dual-channel polarization dependent phase detection, via the Two-Dimensional Second Harmonic Dispersion Interferometer (2D-SHDI). The 2D-SHDI device was tested in a harsh environment and was precise enough to reach sub-10 mrad harmonic phase dispersion sensitivity as well as several tens of microns spatial resolution, while using a stable and easy to implement optical configuration. During testing, the time resolution of the 2D-SHDI was 600 ps set by the laser pulse time duration. The Two-Dimensional Second Harmonic Dispersion Interferometer (2D-SHDI) performs single exposure widefield quantitative phase imaging by utilizing a common path second-harmonic dispersion interferometer and employing pixel-by-pixel polarization-sensitive dual-channel homodyne phase-detection. The present 2D-SHDI utilizes opto-mechanical components mounted on an aluminum cage system allowing for a very compact and structurally rigid design.

In an aspect, the 2D-SHDI determines the optical characterization of a transparent sample by the simplified process described below.

In an aspect, first, a linearly polarized fundamental light beam is generated. Then, a first second harmonic beam with an orthogonal polarization to the fundamental beam is generated by a first second harmonic unit. Next, the fundamental beam and the first second harmonic beam pass through the transparent sample. Then, the polarization of the first second harmonic beam is rotated ninety degrees, such that it is parallel to the polarization of the fundamental beam. Then, a second second harmonic beam is generated with a polarization orthogonal to the fundamental beam and the first second harmonic beam. At this stage, there are three light beams: (1) a fundamental beam linearly polarized, (2) a first harmonic beam with parallel polarization to that of the fundamental beam, (3) a second second harmonic beam with orthogonal polarization to that of the fundamental beam and the first second harmonic beam, wherein the fundamental beam and the first second harmonic beam have passed through the sample and the second second harmonic beam has not passed through the sample. Next, the fundamental beam is dumped from the path using a harmonic separator. Now, there are two light beams with orthogonal polarizations: (1) the first second harmonic beam which has passed through and been altered by the sample and (2) the second second harmonic beam which has not passed through or been altered by the sample. Next, the two second harmonic beams are mixed by a polarizing beam splitter, such as a polarizing beam splitter cube. Then, the mixed beams are transmitted and reflected by the polarizing beam splitter to two cameras. The cameras are positioned such that each camera takes an image of either the transmitted light beams or the reflected light beans, which have a phase difference of 71 It should be understood that in alternate embodiments the optical components can be aligned in different configurations.

In an aspect, in order to acquire and compare precisely the phase data, the cameras must be spatially synchronized to ensure that the images they take correspond pixel by pixel to the exact same spatial location. Additionally, it should be noted that, in order to perform data analysis, the calibration parameters V and a must be determined before, during or after the interferogram data collection. Once the data acquisition has been performed, the data analysis can begin. First V and alpha are determined as disclosed hereinafter when referring to FIG. 2. Then the two images are encapsulated and combined into a ratio matrix r. Then the harmonic phase is evaluated, wherein if the sample is cylindrically symmetric an Abel transformation is performed.

In an aspect, the second harmonic interferometer disclosed herein is a special common-path two-color interferometer, where the optical path length difference between a fundamental laser and its collinear second-harmonic is measured, i.e., $\int_L \Delta n dl$ where $\Delta n=n(\lambda/2)-n(\lambda)$, and L is the geometrical path over the sample. Being fully common-path by design and using a single light source, this interferometer is intrinsically insensitive to vibrations, and easy to implement, allowing high phase resolution even in harsh environments.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

Figure 1A:
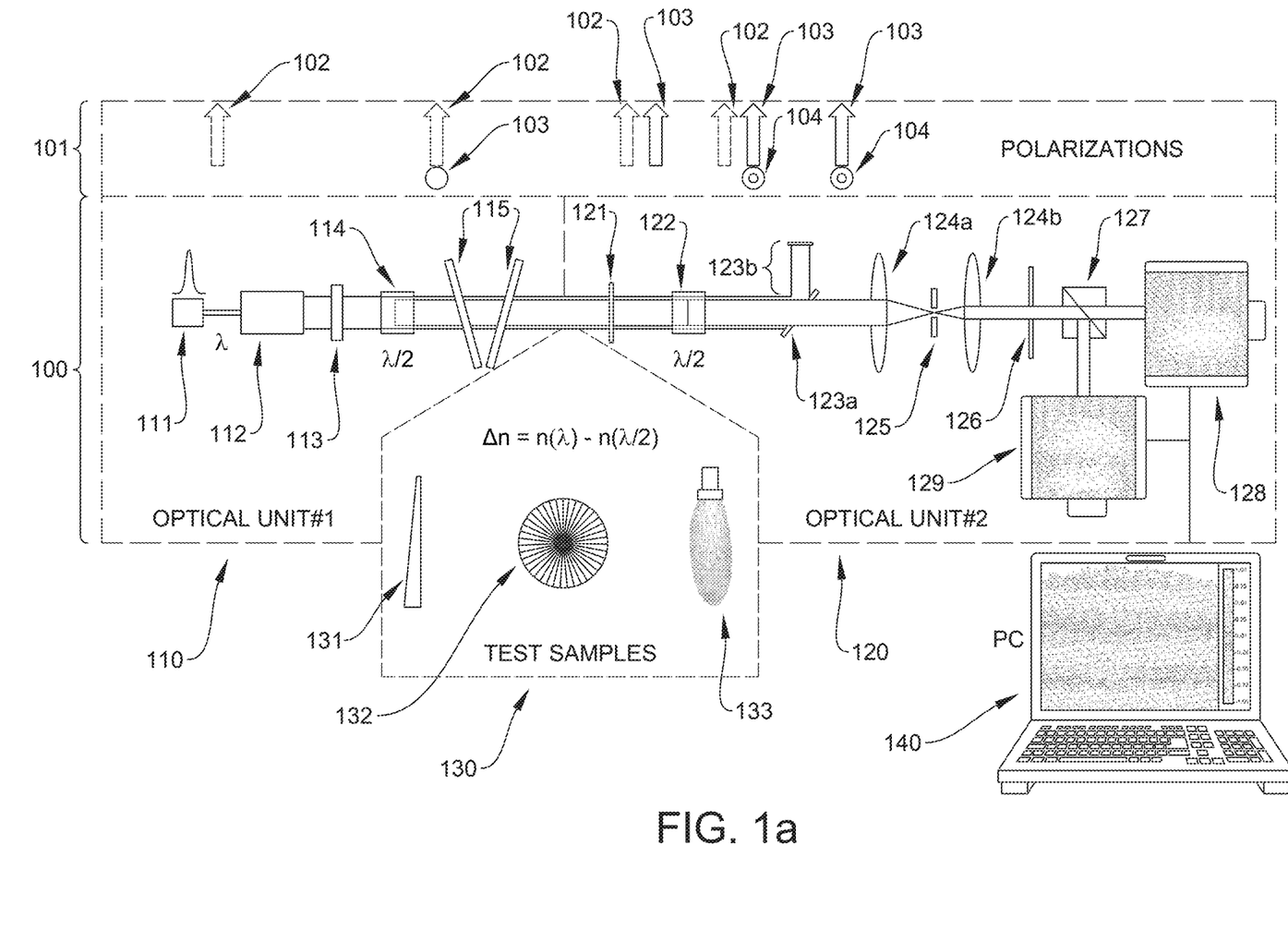
FIG. 1a shows a schematic diagram of an exemplary embodiment of the two-dimensional second harmonic dispersion interferometer 100 (interferometer, 2D-SHDI) device.
Figure 1B:
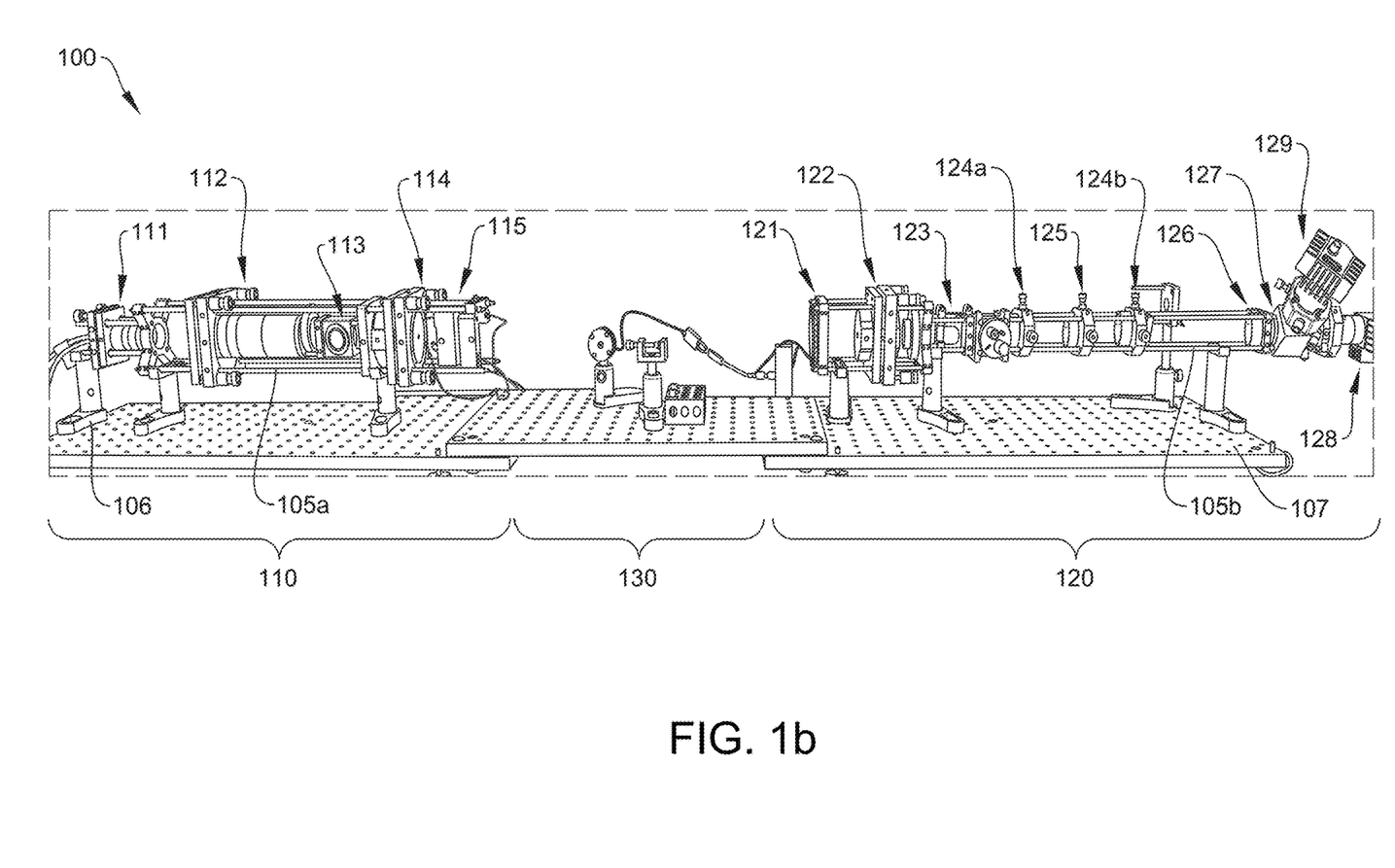
FIG. 1b shows an exemplar test setup of the 2D-SHDI 100.

FIG. 1a shows a schematic diagram of an exemplary embodiment of the Two-Dimensional Second Harmonic Dispersion Interferometer 100 (interferometer, 2D-SHDI) device and illustrates, among other things, the polarizations 101 of the beams present during various stages of the interferometer's 100 operation, as disclosed hereinafter. FIG. 1b shows an exemplar test setup of the 2D-SHDI 100. The 2D-SHDI 100 components may be mounted uniaxially (i.e., the components are aligned along one optical axis), such that the interferometer 100 is fully common-path. It should be understood that the components do not need to be mounted on the same geometric axis in order to be aligned along one optical axis. For example, achromatic components, such as mirrors or parabolic mirrors, may be used to align components, which are mounted along different geometric axes, to one optical axis, as it is known to a person of ordinary skill in the art (POSITA).

The 2D-SHDI 100 may be mounted on an adjustable aluminum cage system 105a,b in order to provide a design which may be compact and stable. As an example, such a design may be achieved by using the ThorLabs 30 mm and 60 mm cage-systems and opto-mechanical components to mount the 2D-SHDI 100. Additionally, the aluminum cage system 105a,b may be secured via adjustable posts 106 onto a breadboard 107, for example. Then, the breadboard 107 with the mounted components of the 2D-SHDI 100 may be placed on a supporting surface, such as a sturdy table with metallic legs, for example. All optical components, disclosed hereinafter, may be assembled two independent Optical Units (OUs), Optical Unit #1 110 (OU1) and Optical Unit #2 120 (OU2), such that the components of each OU are mounted onto two independent aluminum cage systems 105a and 105b, respectively, which gives each OU 110 and 120 its own intrinsic optical axis. Assembling the OUs independently allows each OU 110 and 120 to have its own basic alignment capability, wherein each OUs vertical tip may be adjusted via posts 106 on the aluminum cage system 105a,b and horizontal tilt may be adjusted manually via the placement of the OU on the breadboard 107, for example. The mounted test sample (sample) 130, which is a sample of a transparent medium, may be mounted independently between OU1 110 and OU2 120.

Optical Unit #1 110 may comprise the following components: fundamental beam generator 111, optical beam expander assembly (beam expander, BE) 112, variable attenuator (VA) 113, second harmonic unit 1 (SH1) 114, and phase compensator (C) 115. Optical Unit #2 120 may comprise the following components: waveplate (WP) 121, second harmonic unit 2 (SH2) 122, harmonic separator (HS) 123a, lens 1 (L1) 124a, lens 2 (L2) 124b, pin hole (PH) 125, filter (F) 126, polarizing beam splitter (PS) 127, camera A (A) 128a, camera B (B) 129a. As an example, the mounted test sample (sample) 130 may be a glass wedge window 131, a vortex lens 132, a gas jet 133, as disclosed in greater detail hereinafter when referring to FIGS. 3a-c and 4a-f.

To determine the optical characterization of a transparent sample 130 the 2D-SHDI 100 first uses a fundamental beam generator 111, which may be a passive Q-switched microlaser, to generate linearly polarized pulses (fundamental beam) 102. As an example, the pulses may be 1064 nm with 100 micro-Joule energy and 600 picosecond time duration, which can be externally triggered up to 1 kHz. Next, the fundamental beam passes through an optical beam expander assembly 112 which changes the diameter of a collimated input beam such that the diameter of the collimated output beam matches the diameter of the sample 130. As an example, the BE 112 may collimate the fundamental beam to a diameter of approximately 7.6 mm at $1/e^2$ intensity, which may match the sample 130. It should be understood that the beam expander assembly 112 may be used to increase or decrease the diameter of the fundamental beam in order to determine the optical characterization of large and small samples. This is advantageous as changing the beam diameter enables the 2D-SHDI 100 to be capable of performing widefield measurements in one pulse, which allows for very accurate data collection and analysis. In other words, the 2D-SHDI 100 can perform a complete measurement of the transverse profile of both large samples, such as gas jet, and small samples, such as for microscopy, in one pulse. Such widefield measurements are particularly useful regarding dynamic samples. Another use of single pulse widefield measurements may be for acquiring a "video" of dynamic samples via taking many single pulse widefield image measurements quickly during a period of time.

Then, a variable attenuator 113 comprising a half-wave plate and a polarizer, is used to control the laser pulse energy.

Next, second harmonic unit #1 (SH1) 114 generates the first of two second harmonic beams, hereinafter referred to as second harmonic beam A (SH beam A, SHA, SHA beam, first second harmonic beam) 103. It should be noted that the SHA beam 103 has an orthogonal polarization to that of the fundamental beam 102. As an example, the SHA 114 and 122 may be two non-critically phase-matched LBO crystals with dimensions 10×10×10 mm3, which are heated to 149 Celsius in a crystal oven, wherein the LBO crystals are oriented with their optical axes aligned in the same direction, i.e., aligned uniaxially. It should be noted that the 2D-SHDI implements non-critical phase matching, which minimizes the walk-off displacement between the fundamental beam and the SH beams. Minimizing the walk-off displacement is necessary in order to achieve wave-front overlap between the finally interfering SH beams, as known to a person of ordinary skill in the art (POSITA).

After the SHA beam is generated in SH1 114, a phase compensator (compensator, C) 115 is used to induce a variable homogeneous phase-shift between the fundamental 102 and SHA 103 beam without inducing a transverse spatial shift between the fundamental 102 and SHA 103 beams. As an example, the phase compensator 115 may comprise two AR-coated BK7 optical windows set with their angles opposite relative to the both the fundament and SHA beams, which share the same propagation direction. Additionally, the phase compensator may perform dual counter compensating phase adjustment via optical windows held by motorized mounts whose tilt angles are synchronously controlled, which is advantageous as it allows easy calibration of the interferometer, as disclosed hereinafter when referring to FIG. 2.

Next, the fundamental beam 102 and SHA 103 beam pass through the transparent sample 130. Thus, the phase of both the fundamental 102 and SHA 103 beams have been altered due to the optical dispersion of the sample.

After passing through the transparent sample 130, the fundamental beam and SHA beam pass through a waveplate (WP) 121, which may be half-wave at 532 nm and full-wave at 1064 nm, for example. The waveplate 121 is used to rotate the polarization of the SHA beam by 90 degrees while leaving unaffected the polarization of the fundamental beam. Thus, the SHA beam and fundamental beam now have parallel polarizations, as shown.

Then, the second harmonic unit #2 (SH2) 122 is used to generate another second harmonic beam (SHB, second second harmonic beam) 104, which has an orthogonal polarization to that of the fundamental and SHA beam polarizations, as shown. Thus, the 2D-SHDI has generated three beams: a fundamental beam 102, a first second harmonic beam (SHA beam) 103, and a second second harmonic beam (SHB beam) 104, wherein the fundamental beam and SHA beam have passed through and been altered by the test sample 130 the SHB beam has not passed through the test sample 130. Additionally, it should be understood that the SHB beam carries the double of the phase acquired by the fundamental beam, due to the fundamental beam passing through the test sample 130.

Next, two harmonic separators (HS) 123a and a colored-glass filter (filter, F) 126 are used to remove the fundamental beam 102 from the beam path, as known to a POSITA. It should be noted that two harmonic separators 123a are used, but only one is shown in FIG. 1a for clarity. In other words, the fundamental beam is removed 123b from the interferometer 100 optical path. In between the harmonic separators 123 and filter 126 are a pair of positive lenses (L1 and L2) 124a and 124b, which change the diameter the SHA and SHB beams back to the original diameter of the fundamental beam. As an example, the lenses 124a,b may de-magnify the SHA and SHB beams by a factor of about 1.53, for example. If needed, a pinhole (PH) 125 may be inserted at the focal plane of L1 124a to perform spatial filtering by removing unwanted scattered light from the interfering beams SHA 103 and SHB 104. The size of the pinhole 125 may be based on the diameter of the finally interfering SH beams 103, 104, which may be 5.4 mm at $1/e^2$ intensity, for example. It should be understood that the pinhole 125 be positioned a specific distance after L1 as determined by the focal length of lens L1.

Then, dual-channel polarization sensitive homodyne phase detection is performed by using a polarizing beam splitter (beam splitter, PS) 127 to mix SHA and SHB. As an example, the polarizing beam splitter 127 may be a polarizing beam splitter cube, wherein the optical axis of the PS 127 is set at 45 degrees relative to the polarization of the incoming SH beams SHA 103 and SHB 104.

It should be noted that optical elements do not need to be aligned in the order shown by FIGS. 1a,b. For the 2D-SHDI 100 to operate, the beam expander should be disposed before the sample and the lenses should be disposed after the sample. Additionally, the fundamental beam generator should be disposed before SH1, SH1 should be disposed before the sample, and SH2 should be disposed after the sample. An exemplary alternate order for the components may be as follows: fundamental beam generator, variable attenuator, beam expander, SH1, waveplate, SH2, harmonic separators, L1, pinhole, L2, filter, then polarizing beam splitter.

It should also be noted that alternate achromatic elements may be used for the 2D-SHDI 100 in place of or in addition to the disclosed optical components for the purpose of improving accuracy or to modify the 2D-SHDI 100 for measuring different sample types.

Finally, the mixed SHA and SHB light beams are transmitted and reflected by the polarizing beam splitter 127, then detected by two cameras, denoted as camera A (A) 128 and camera B (B) 129, respectively. In other words, the polarizing beam splitter 127 transmits the mixed light beams to camera A 128 and reflects the mixed light beams to camera B 129. As an example, the cameras A 128 and B 129 may both be 12-bit resolution cameras. The cameras A 128 and B 129 record the mixed light beams as two interferograms, with a phase difference of π relative to each other. Thus, the level of the digital signals at the pixel, i.e., the light intensity of the mixed beams at each pixel, identified by indexes (i,j), Aij and Bij, are given by the following equation, hereinafter referred to as "Equation 1,"

$$\{\alpha_{A/B}(I^{ij})^2\}/\{2[\beta_1+\beta_2\pm 2\sqrt{(\beta_1\beta_2)}\cos(\Delta\varphi^{ij}_S+\Delta\varphi^{ij}_{BG})]\},$$

where $\alpha_{A/B}$ are the camera responsivities,
$I^{ij}$ is the fundamental beam intensity,
$\beta_m \times (I^{ij})^2$ with m=1, 2 are the SH beam intensities,
the ±sign in the square brackets on the right-hand side refer to camera A and B, respectively, i.e., a + is used when calculating the level of the digital signal at each pixel for camera A ($A^{ij}$) and a − is used when calculating the level of the digital signal at each pixel for camera B ($B^{ij}$)),
$\Delta\varphi^{ij}_S=(4\pi/\lambda)\int_{Lij}\Delta n^{ij}dl$ is the harmonic phase shift produced by the sample,
and $\Delta\varphi_{BG}$ represents the background harmonic dispersion phase due to the optically dispersive elements, other than the test sample, including the homogeneous phase induced by the compensator 115.

It should be noted that the interference signals obtained by camera A 128 and camera B 129 can span over the complementary maxima and minima by changing the compensator 115 tilt angle which thereby adjusts the phase.

Figure 2:
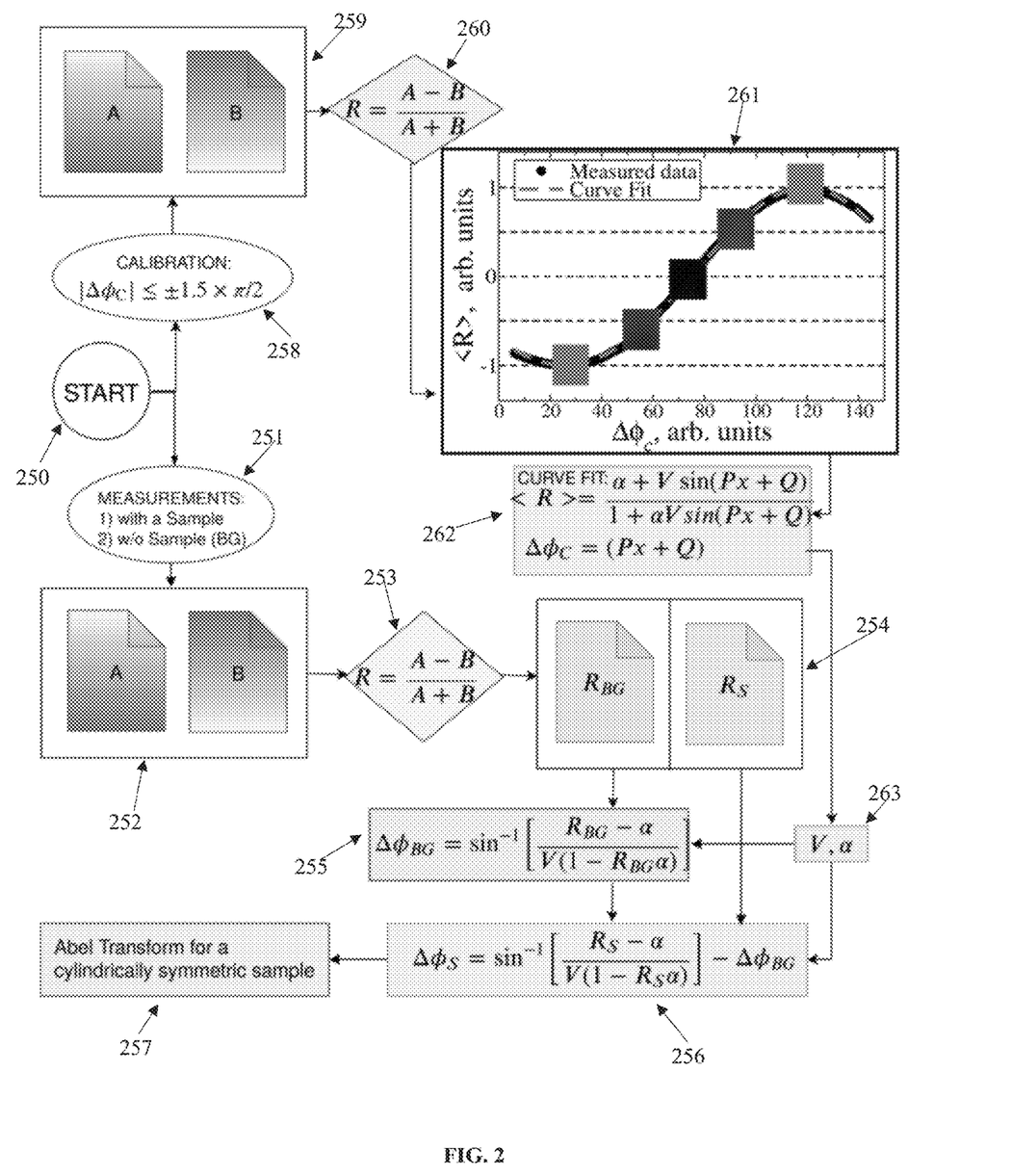
FIG. 2 is a flow chart summarizing the data acquisition and analysis procedure for the 2D-SHDI.

FIG. 2 is a flow chart summarizing the data acquisition and analysis procedure for the 2D-SHDI. It should be noted that the matrix notation has been dropped from the flow chart for clarity.

The dual-channel homodyne phase-detection method utilized by the 2D-SHDI relies on encapsulating the interferograms gathered from the two cameras A 128 and B 129 during data acquisition into a "Ratio Matrix" (R). In other words, the Ratio Matrix is obtained from the two images recorded by cameras A and B, whose elements are defined by the following equation, hereinafter referred to as "Equation 2,"

$$(A^{ij}-B^{ij})/(A^{ij}+B^{ij})=\{\alpha+V\sin(\Delta\varphi^{ij}+\Delta\varphi^{ij}_{BG})\}/\{1+\alpha V\sin(\Delta\varphi^{ij}+\Delta\varphi^{ij}_{BG})\},$$

where $V\equiv 2\sqrt{(\beta_1\beta_2}/(\beta_1+\beta_2))\leq 1$ is the fringe visibility, and $\alpha\equiv(\alpha_A-\alpha_B)/(\alpha_A+\alpha_B)$.

Since the images acquired by the two cameras are combined at the start (250) of data acquisition, it is necessary that the signal at each pixel (i,j) on the two images represent the light intensity at the very same location of the two recorded interferograms in order to accurately retrieve the data which properly represents matrix R. The two SH beams are collinear and superimposed by design in each camera, however the actual position of the beam within the sensor array may differ between the two cameras, therefore, a spatial synchronization between the two images is advised prior to the measurements.

Spatial synchronization may be accomplished by first setting the compensator 115 phase to have equal intensity on cameras A 128 and B 129. Then, mechanically adjusting the cameras via rotation and translation, such that the light beams SHA 103 and SHB 104 impinge with the same orientation in the central part of the sensor frame on each camera. Next, a knife-edge is temporarily introduced into the interfering beam path to facilitate key-point identification in the two images. Lastly, a home-developed data acquisition software is used to center the two images via rotation and translation. As an example, the home-developed software may be a Python-based software, which may be adapted from open-source methods used in OpenCV using (Euclidean) Homography. Thus, a new common coordinate reference system can be defined, such that corresponding pixels (i,j) on each of the two interferograms obtained by camera A 128 and camera B 129 represent the very same location of the interfering second harmonic light-beams' transverse-cross-section. After the spatial synchronization is complete, the values of and accurately represent the intensity distribution of the interferograms according to a common coordinate reference system, and the matrix R can be properly evaluated. Now, accurate data acquisition and analysis can be started (250) to determine the optical characterization of a transparent sample.

First, the data acquisition and analysis process begins by obtaining two interferogram measurements from cameras A 128 and B 128 (251): a measurement with the test sample 130 positioned between OU1 and OU2 and a measurement of the background interference taken with no test sample 130 between OU1 and OU2. Then, a Ratio Matrix R is evaluated for each measurement (253), wherein RBG is used to denote the background measurement taken without the sample and $R_S$ is used to denote the measurement taken with the sample (254). Next, the phase $\Delta\varphi^{ij}_{BG}$ (255) and $\Delta\varphi^{ij}_S$ (256) is calculated for each matrix RBG and $R_S$, respectively, as shown in FIG. 2 when the measured harmonic phase shift $|\Delta\varphi^{ij}_S+\Delta\varphi^{ij}_{BG}|<\pi/2$.

Additionally, it should be noted that when the measured harmonic phase shift $|\Delta\varphi^{ij}_S+\Delta\varphi^{ij}_{BG}|<\pi/2$, the sin function in Equation 2 is single-valued. Thus, the 2D harmonic phase map of the sample 130 can be evaluated as the following equation, hereinafter referred to as "Equation 3,"

$$\Delta\varphi^{ij}_S=\arcsin[(R^{ij}-\alpha)/(V(1-R^{ij}\alpha))]-\arcsin[(R^{ij}_{BG}-\alpha)/(V(1-R^{ij}_{BG}\alpha))],$$

where the first term on the left side of the equation represents the sample phase $\Delta\varphi^{ij}_S$ evaluated from the matrix $R_S$ and the second term on the right side of the equation represents the background phase $\Delta\varphi^{ij}_{BG}$ evaluated from the matrix RBG recorded without the sample.

As shown by FIG. 2, it is necessary to find the calibration parameters V and α (263) in order to evaluate the phase $\Delta\varphi^{ij}_{BG}$ (255) and $\Delta\varphi^{ij}_S$ (256). The calibration parameters V and a can be determined before, during or after the interferogram data collection. As an example, the calibration process, as disclosed hereinafter, may be determine before data collection, then checked periodically during data collection and at the end of data collection in order to ensure accurate results are obtained throughout 2D-SHDI operation. It should be understood that, as V and a are needed to perform phase calculations, the calibration parameters must be determined before phase calculation are performed.

To determine the calibration parameters, first, the compensator 115 induced phase $\Delta\varphi_C$ is scanned between ~±1.5× π/2. Then, using the images collected from cameras A 128 and B 129 (259), the matrix R is calculated (260). In the inset graph (261) shown in FIG. 2, the result of such calibration scan is reported, wherein the data points represent the average value <R> calculated over the recorded matrix. It should be noted that the images of some actual matrices are also reported. The calibration parameters are found by fitting the curve (262) with Equation 2, wherein the linear dependence of $\Delta\varphi_C$ is assumed with frame index over the scanned range. As an example, the actual calibration parameters found for the 2D-SHDI may be: V=0.98(2) and α=−0.091 (8). It should be noted that the interferometer working point may be set for maximum sensitivity by pre-adjusting $\Delta\varphi_C$ to intentionally obtain <R>~0, i.e., $\Delta\varphi^{ij}_{BG}$~0. Thus, the measured phase change may induce an increase or a decrease of the $R^{ij}$ values depending upon the initial setting of $\Delta\varphi_C$, resulting in the phase retrieved through Equation 3 being positive or negative. This difference is evident from the periodic calibration curve (261) and is taken into account during data analysis. In other words, there is a sign ambiguity during the phase calculation, which does not affect the device performance but must be taken into account during data analysis.

Once V and a are determined, $\Delta\varphi^{ij}_S$ (256) can be accurately calculated and analyzed. If the sample is assumed to be cylindrically symmetric, such as a pulsed or continuous gas sample, the analysis may involve performing an Abel Inversion (257), as known to a POSITA.

Figure 3A:
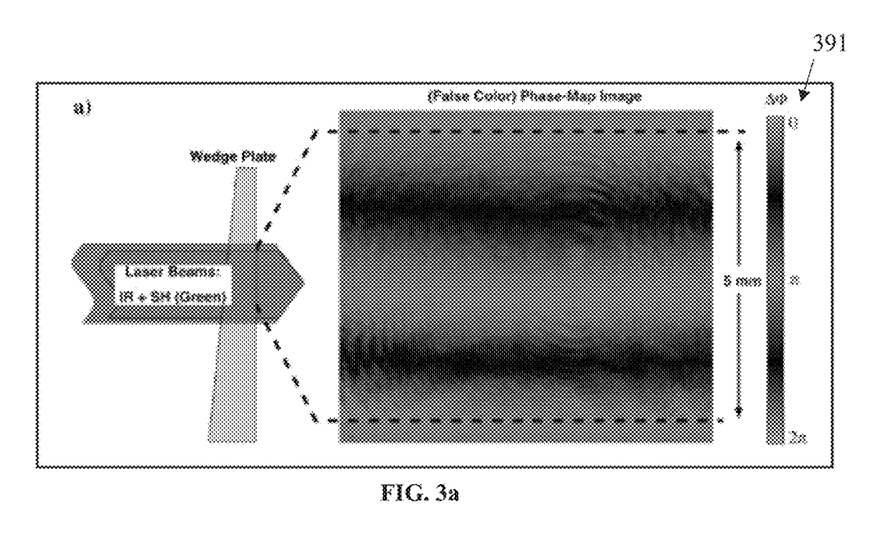
FIG. 3a-c illustrates exemplary measurements of static test samples.
Figure 3B:
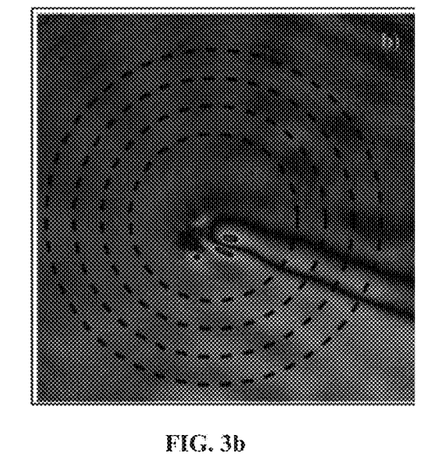
Figure 3C:
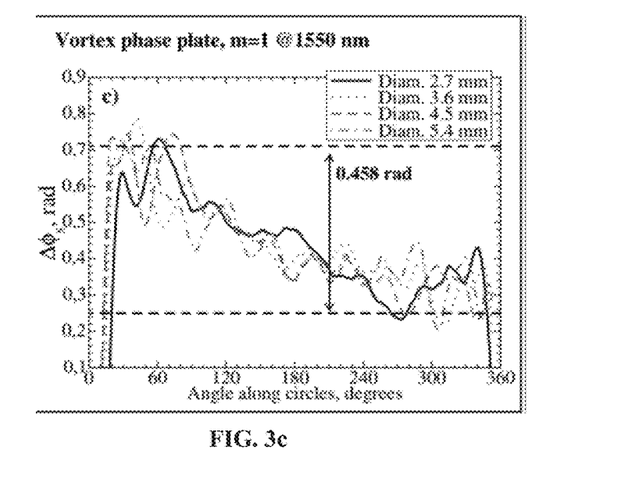

FIG. 3a-c illustrates exemplary measurements of static test samples. The performance of the 2D-SHDI can be tested quantitatively by measuring static-phase-object samples with a known harmonic-dispersion phase pattern, such as a glass-wedge window 131 and a vortex lens (spiral phase plate) 132, such as a fused-silica spiral-phase plate, for example.

FIG. 3a displays a (false-color) full fringe matrix R corresponding to the measurement of a wedged window 131 of FIG. 1, performed without pinhole 125, wherein the colorbar 391 for the phase is shown on the right. As an example, the wedged window may be an AR-coated BK7 wedged window with a specified 8.7(2.9) milli-radian wedge angle (Thorlabs, Model WW11050-C15). The spatial width of the fringe is 5.0(1) mm corresponding to a measured wedge angle of 8.2(2) milli-radian, estimated from the well-known BK7 dispersion.

FIG. 3b shows an exemplar 2D phase map corresponding to a spiral phase plate 132 measured using a 100 μm pinhole. As an example, the spiral phase plate 132 may be a fused silica (FS) vortex lens (Vortex Photonics, V-1550-20-1). FIG. 3c shows the phase line out along the circles highlighted in FIG. 3b. As shown in FIG. 3c, there is a running average of 20 points corresponding to a spatial smoothing in the ~100 μm range. FIG. 3c also shows the overall expected harmonic-phase curve pattern estimated, full step height of ~3.49 um and $\Delta n_{FS}$=0.0111, according to the specifications of the tested spiral-phase plate 132. These results show a close agreement between the estimated phase and expected phase, thereby demonstrating the capability for actual wide-field-harmonic-phase-dispersion measurements using the 2D-SHDI.

It should be noted that in the data reported in FIGS. 3a-c, the diffraction patterns appear as a spurious noise in the images. Such diffraction patterns are due to dust particles on the surfaces of the optics, specifically on the beam expander optical system, which were not possible to remove during the present experiments, as well as to the large refraction from the sharp step present in the spiral-phase-plate sample 132.

Figure 4A:
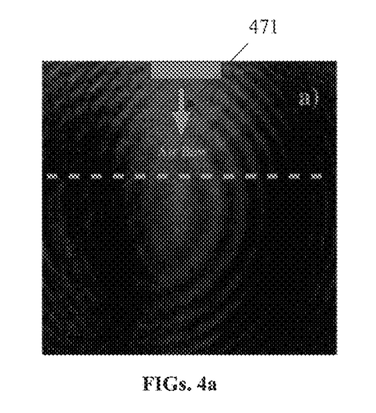
FIGS. 4a-c illustrate exemplar wide-field quantitative phase imaging of an air gas jet produced by a pulsed valve.
Figure 4B:
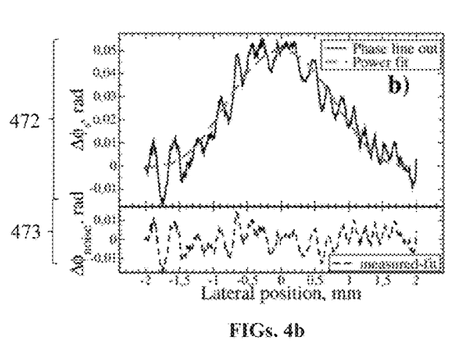
Figure 4C:
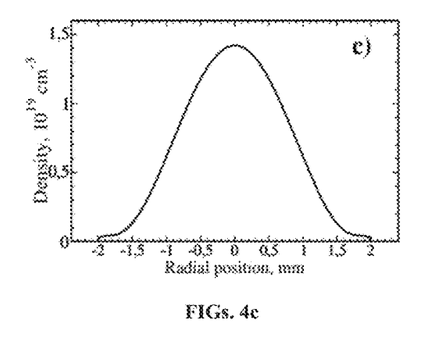
Figure 4D:
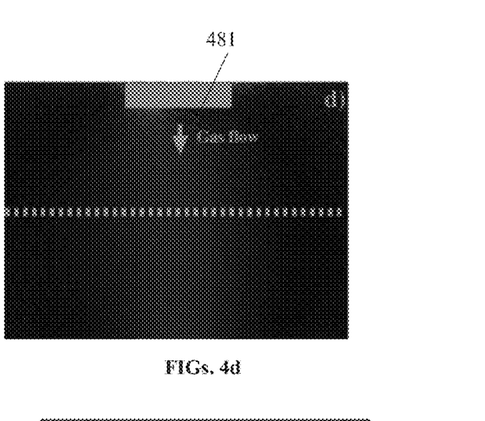
FIGS. 4d-f illustrate wide-field quantitative phase imaging of a continuous gas jet produced by a commercial duster.
Figure 4E:
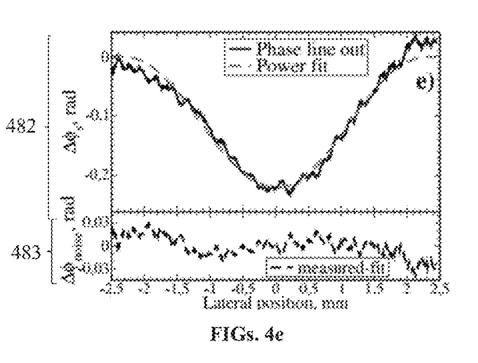
Figure 4F:
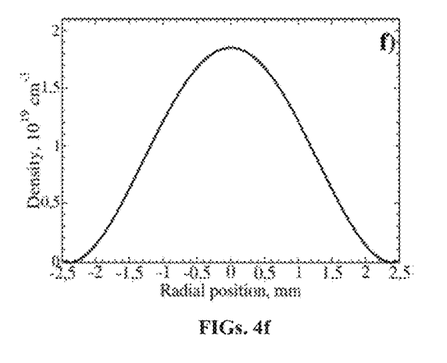

FIGS. 4a-c illustrate exemplar wide-field quantitative phase imaging of an air gas jet produced by a pulsed valve and FIGS. 4d-f illustrate wide-field quantitative phase imaging of a continuous gas jet produced by a commercial duster. As an example, the pulsed valve used to test the 2D-SHDI may be Parker-Pulse Valve series 9 with 1-mm diameter nozzle and 8 Atm backing pressure. Additionally, the commercial duster used may be a continuous 1,1-Difluoroethane gas jet from a commercial duster (Ultra Duster) with an extension-tube nozzle having ~1.4-mm internal-diameter. It should be noted that both gas jets are expanding into the ambient atmosphere and the measurements were performed using a 25 μm pinhole 125 in OU2 120. It should also be noted that the measurement with the pulsed-air jet is acquired 350 μs after a trigger signal is sent to the pulsed-valve power-supply controller, while the measurement with the duster is representative of a steady, mild-continuous flow obtained by manually operating the duster with the extension tube fixed to a metallic post.

In the phase map shown by FIG. 4a, the arrow 471 indicates the position of the air jet flow. Similarly, in the phase map shown by FIG. 4d, the arrow 481 indicates the position of the duster gas flow. In the upper panels 472 and 482 in FIGS. 4b and 4e, respectively, the phase value (shown by the unbroken zigzag line), which is measured along the dashed line shown in FIGS. 4a and 4d, is reported with a 10-pixel running average which corresponds to a spatial smoothing at the camera detector. Assuming the gas-flow densities are cylindrically symmetric, an Abel-inversion analysis is performed, as known by a POSITA. Specifically, a power fit is performed on the measured phase-line-out data, using a power to the 6th function, as shown by the dashed line in the upper panels 472 and 482 of FIGS. 4b and 4d, respectively.

The difference between the measured-phase data (solid zigzag line) and the power-fit (dashed line) is shown in the lower panels 473 and 483 of FIGS. 4b and 4e. Said difference is representative of the noise-level on such line-out phase data. In this example, the RMS value of such phase noise over the entire spatial range of the line out is approximately 6 milli-radians for the pulsed-air-gas jet and 13 milli-radians for the duster-gas flow. It should be noted that turbulence due to the gas-jet expansion into an ambient-atmospheric pressure does appear to contribute to the overall variability within the 2D harmonic-phase map images.

The actual radial distribution of the partial number density in the gas jet is shown plotted in FIGS. 4c and 4f. In this example, said plot is found following the procedure described in F. Brandi and F. Giammanco, *Opt. Express* 19, 25479 (2011), using: i) the dispersion of air $\Delta n_{air}$=44.3×10-7 at 1 amg (=2.69×1019 cm-3) S. Velasko and D. Eimerl, *Appl. Opt.* 25, 1344 (1986); ii) the dispersion of 1, 1 Difluoroethane in gas phase $\Delta n_{duster}$~109×10-7 at 1 amg as extrapolated from the liquid phase dispersion estimated from Ch. Wohlfarth Refractive index of 1,1-difluoroethane (SpringerMaterials, 2008).

In this example, the particle density found for both gas jets is approximately $10^{19}$ cm$^{-3}$ above the surrounding particle density, which is in line with expected values achievable by these gas jets expanding into an ambient atmospheric air pressure at 1 atm.

Thus, a novel, wide-field, common-path, second-harmonic, dispersion interferometer is demonstrated. Preferably, the method employs a pulsed, Nd:YAG laser, frequency doubled before, and after, a dispersive sample. The common-path system design allows the phase difference between the two frequency-doubled beams to be measured interferometrically, using two-digital cameras. The pixel-by-pixel homodyne-imaging modality synchronizes the phase-encoded images into a single, data-frame, ratio matrix, using a software-co-registration algorithm, providing a transverse sampled area of ~0.2 cm^2 and (camera-limited) frame rate up to 100 fps (frame-per-second). The phase shift measured for two static-samples matches a-priori predictions, while measurements of gas jets having small phase shifts resulted in density values matching the expected order of magnitude with a phase-sensitivity of ~10^-2 rad. The 2D-SHDI is broadly extensible to measurements in solids, liquids, gas, and plasma; for example, a line-integrated, electron density of ~2×10^14 cm^-2 can be measured. Such capability is desirable for many practical applications, e.g., plasma diagnostics, and laser wake-field acceleration target characterization, applications for label-free imaging of transparent biological specimens (e.g., hystological slices), and characterization of optical phase objects.

Alternative embodiments may include the use of 1) larger diameter, achromatic optical components and crystals, to increase the probe-beam diameter, and 2), higher quality optics and improved alignment precision, to reduce the noise level, extend the phase sensitivity, and enhance the spatial resolution.

It is believed that widefield quantitative harmonic dispersion phase imaging with high phase and spatial resolution is therefore demonstrated for the first time. The presented approach is based on the principles of second-harmonic interferometry which allows the achievement of high-phase sensitivity due to the fully common-path configuration, combined with the dual-channel polarization, homodyne-phase-detection scheme. Even with the experiments being performed in a harsh-laboratory environment and with a basic-alignment capability, the overall harmonic phase sensitivity is better than ~$10^{-2}$ radians over an area of up to several mm in diameter. For comparison, if the instrument is used as a diagnostic to measure the density in plasma, the capability reported above will correspond to a line-integrated electron density sensitivity better than $2\times10^{14}$ cm$^{-2}$.

It may be advantageous to set forth definitions of certain words and phrases used in this patent document. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An interferometer comprising a fundamental beam generator, a first second harmonic generator disposed after the fundamental beam generator, a waveplate disposed after the first second harmonic generator, a second second harmonic generator disposed after the waveplate, a harmonic separator disposed after the second second harmonic generator, and a polarizing beam splitter disposed after the harmonic separator, wherein the fundamental beam generator, the first second harmonic generator, the waveplate, the second second harmonic generator, the harmonic separator, and the polarizing beam splitter are mounted uniaxially, wherein the interferometer is adapted to change a diameter of a beam to match a diameter of a sample, and to change the diameter of the beam back to its original diameter.

2. The interferometer of claim 1, further comprising a uniaxially mounted beam expander disposed between the fundamental beam generator and a variable attenuator.

3. The interferometer of claim 1, further comprising a uniaxially mounted variable attenuator disposed between the beam expander and the first second harmonic generator.

4. The interferometer of claim 1, further comprising a uniaxially mounted phase compensator disposed between the first second harmonic generator and the waveplate.

5. The interferometer of claim 4, wherein the phase compensator is adapted to perform dual counter compensating phase adjustment.

6. The interferometer of claim 1, further comprising a uniaxially mounted first lens disposed between the harmonic separator and a pinhole.

7. The interferometer of claim 1, further comprising a uniaxially mounted pinhole disposed between the first lens and a second lens.

8. The interferometer of claim 1, further comprising a uniaxially mounted second lens disposed between the pinhole and a filter.

9. The interferometer of claim 1, further comprising a uniaxially mounted filter disposed between the second lens and the polarizing beam splitter.

10. The interferometer of claim 1, further comprising a uniaxially mounted first and a second camera disposed after the polarizing beam splitter, wherein the first camera is mounted uniaxially and the second camera is mounted orthogonally to the first camera.

11. The interferometer of claim 1, wherein the waveplate is configured to rotate by ninety degrees the polarization of a first second harmonic beam generated by the first second harmonic generator.

12. The interferometer of claim 1, wherein the fundamental beam generator is configured to generate a linearly polarized beam.

13. The interferometer of claim 1, wherein the harmonic separator is configured to dump the fundamental beam.

14. The interferometer of claim 1, wherein the polarizing beam splitter is configured to mix a first second harmonic beam and a second second harmonic beam generated by the first second harmonic generator and the second second harmonic generator, respectively.

15. An interferometer comprising a fundamental beam generator, a first second harmonic generator, a beam expander, a second second harmonic generator, a first lens, and a second lens, wherein the first second harmonic generator, the beam expander, the second second harmonic generator, the first lens, and the second lens are all mounted uniaxially, wherein the first second harmonic generator is disposed before a location of a sample and the second second harmonic generator is disposed after said location.

16. The interferometer of claim 15, wherein the beam expander is disposed before said location and the first lens and second lens are disposed after said location.

17. The interferometer of claim 15, wherein the beam expander is adapted to change a diameter of a beam to match a diameter of the sample.

18. The interferometer of claim 15, wherein the first lens and second lens are adapted to change the diameter of the beam back to its original diameter.

19. A method for determining the optical characterization of a transparent medium sample using an interferometer, the method comprising the steps of:
   generating a linearly polarized fundamental beam;
   changing the diameter of the fundamental beam to match a diameter of the sample;
   generating a first second harmonic beam having an orthogonal polarization to the fundamental beam;
   causing the fundamental beam and the first second harmonic beam to pass through the transparent medium;
   rotating the polarization of the first second harmonic beam by ninety degrees, such that to be parallel to the polarization of the fundamental beam;
   generating a second second harmonic beam having a polarization orthogonal to the fundamental beam and the first second harmonic beam;
   dumping the fundamental beam after passage through the transparent medium; and
   mixing the first and second second harmonic beams.

20. The method of claim 19, wherein mixing the first and second second harmonic beams is accomplished using a polarizing beam splitter.

* * * * *